Oct. 25, 1955  D. B. BLAIR  2,721,435
POWER LAWN MOWER

Filed April 17, 1953  3 Sheets-Sheet 1

INVENTOR.
DANIEL B. BLAIR,
BY
McMorrow, Berman + Davidson
ATTORNEYS.

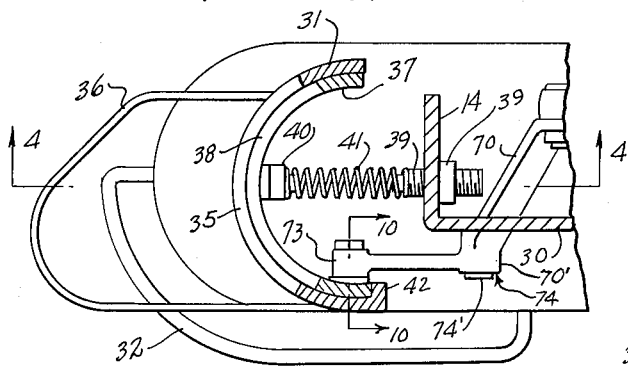
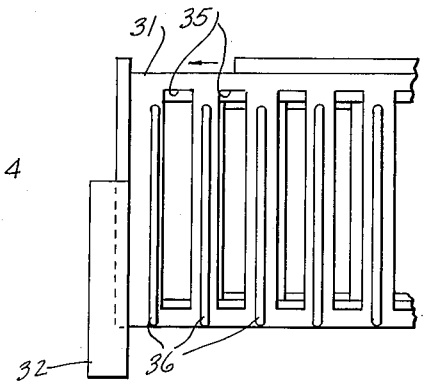
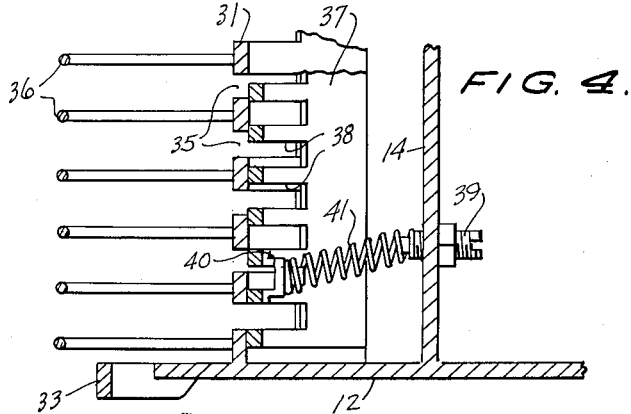
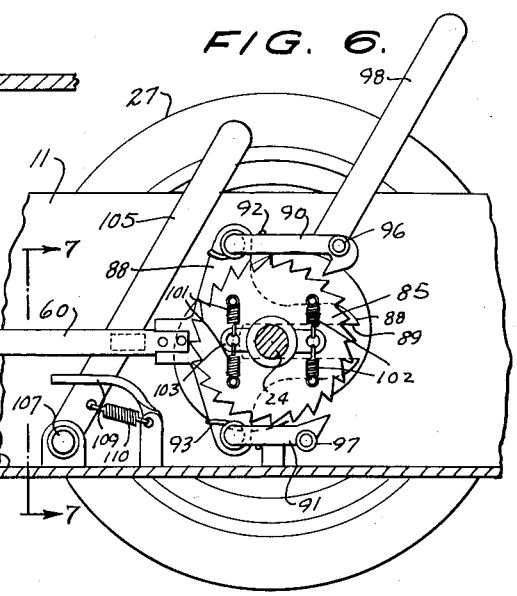
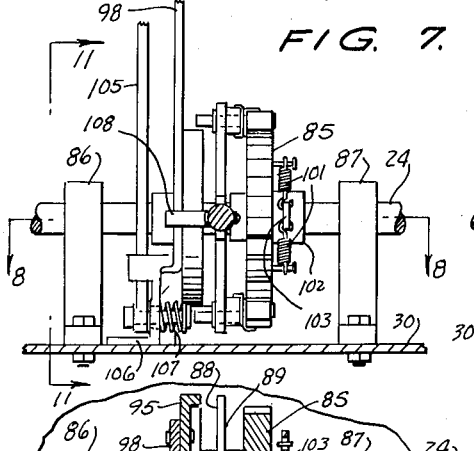
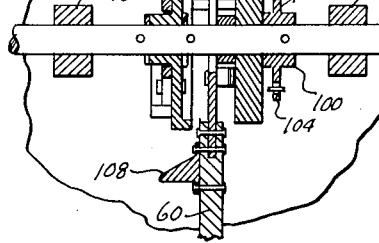

Oct. 25, 1955

D. B. BLAIR 2,721,435

POWER LAWN MOWER

Filed April 17, 1953

INVENTOR.
DANIEL B. BLAIR,
BY
McMorrow, Berman & Davidson
ATTORNEYS.

2,721,435
POWER LAWN MOWER
Daniel B. Blair, Savannah, Ga.

Application April 17, 1953, Serial No. 349,506

3 Claims. (Cl. 56—26.5)

This invention relates to power operated lawn mowers and more particularly to a power operated lawn mower having an internal combustion engine directly connected to the cutter and drive mechanism of the mower.

It is among the objects of the invention to provide an improved power operated lawn mower of simplified construction having a reciprocatory cutter mechanism and a simplified engine of the free piston type directly connected to the cutter mechanism and the propelling mechanism of the lawn mower; which has transversely curved, relatively reciprocable cutter elements which render the operation of the mower highly effective and completely safe; which includes means effectively silencing the operation of the mower; which is of light weight construction and easy to lift and move from place to place; and which is simple and durable in construction, economical to manufacture, and effective and efficient in operation.

Other objects and advantages will become apparent from a consideration of the following description and the appended claims in conjunction with the accompanying drawings wherein:

Figure 3 is a fragmentary cross sectional view on an enlarged scale on the line 3—3 of Figure 1;

Figure 4 is a fragmentary cross sectional view on the line 4—4 of Figure 3;

Figure 5 is an enlarged fragmentary front elevational view of the lawn mower;

Figure 6 is a fragmentary cross sectional view on an enlarged scale on the line 6—6 of Figure 1;

Figure 7 is a fragmentary cross-sectional view on the line 7—7 of Figure 6;

Figure 8 is a fragmentary cross sectional view on the line 8—8 of Figure 7;

Figure 1:
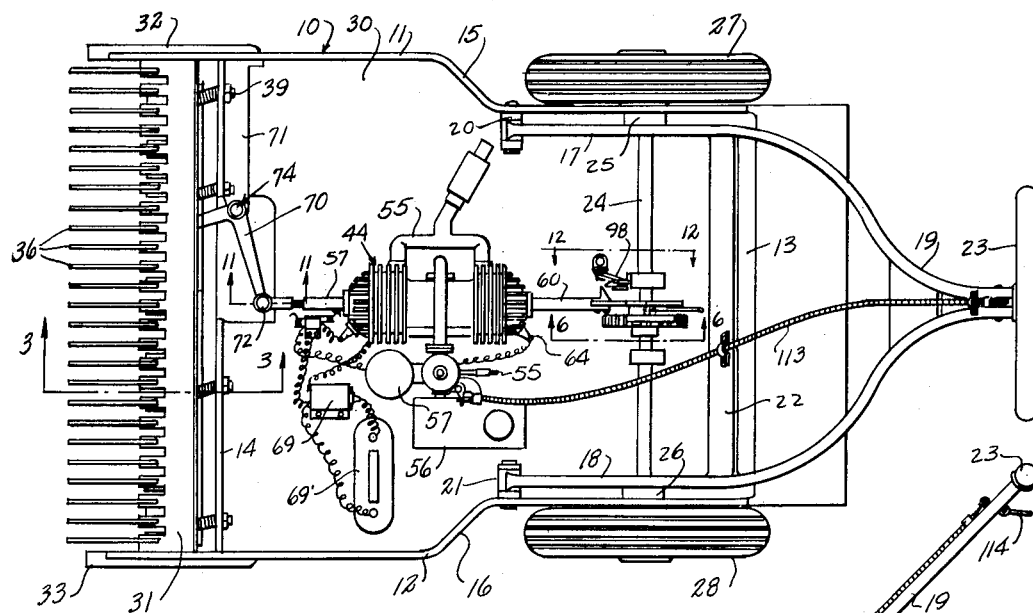
Figure 1 is a top plan view of a power operated lawn mower illustrative of the invention.
Figure 2:
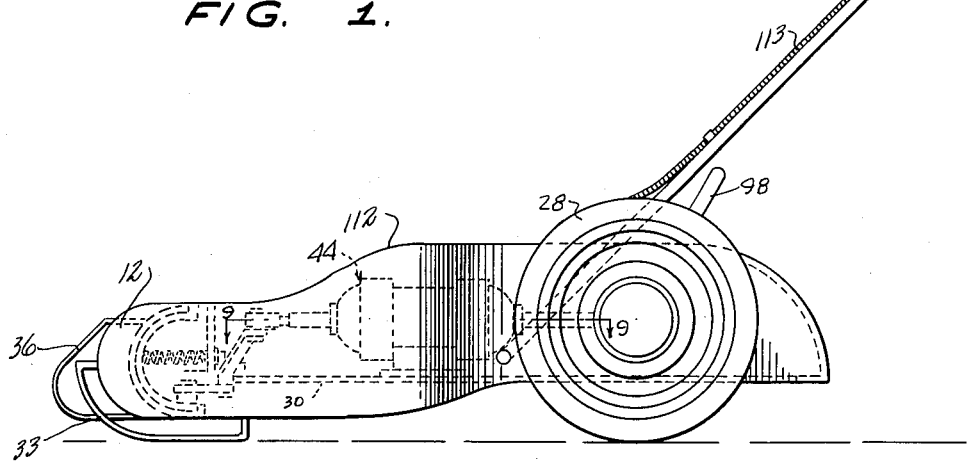
Figure 2 is a side elevational view of the lawn mower illustrated in Figure 1.

With continued reference to the drawings, the lawn mower has a frame, generally indicated at 10, including side members 11 and 12 disposed in spaced apart and substantially parallel relationship to each other, a rear end member 13 extending between and connected to the rear ends of the side members 11 and 12 and a front end or cross member 14 extending between and connected to the side members 11 and 12 near the front ends of these side members.

The side members 11 and 12 are offset inwardly intermediate the length of the frame, as indicated at 15 and 16, symmetrically of the longitudinal center line of the frame so that the rear portion of the frame has a width less than the width of the front portion and the legs 17 and 18 of a handle yoke 19 are pivotally connected at the open end of the yoke to the side members 11 and 12 by the pivotal connections 20 and 21 respectively extending inwardly of the side members immediately to the rear of the offsets 15 and 16 in the side members. A reinforcing bar 22 extends transversely across the handle yoke 19 intermediate the length of the yoke and is secured at its opposite ends to the legs 17 and 18 and a handle bar 23 is secured adjacent its mid-length location to the legs 17 and 18 at the ends of these legs remote from the pivotal connections 20 and 21 and is disposed perpendicular to and symmetrically of the longitudinal center line of the yoke 19.

An axle 24 is disposed below the frame 10 and extends transversely of the rear portion of the frame substantially perpendicular to the longitudinal center line of the frame. This axle is journalled in bearings 25 and 26 secured to the frame side members 11 and 12 respectively and rubber tired wheels 27 and 28 are mounted on the respectively opposite ends of the axle 24 at the outer sides of the frame side members 11 and 12 respectively.

The frame 10 has a bottom wall 30 extending between the frame side members 11 and 12 and the frame end members 13 and 14 and supporting the operating mechanism of the mower and a fixed cutter bar 31 extends transversely of the front end of the frame between the end portions of the frame side members 11 and 12 projecting forwardly of the front end member 14 of the frame and this cutter bar is secured at its respectively opposite ends to the forwardly projecting end portions of the frame members 11 and 12. Skids or runners 32 and 33, preferably formed of strap iron, are disposed one below the front end portion of the frame side member 11 and one below the front end portion of the side member 12 and these runners are secured to the corresponding frame side members and support the front end of the lawn mower.

The fixed cutter bar 31 is a member of substantially semi-cylindrical shape provided with circumferentially extending slots 35 at uniformly spaced apart locations therealong. The slots have a length materially less than the circumferential or angular extent of the transverse cross section of the bar 31, as illustrated in Figure 3 and, in an operative installation, have a width of approximately $3/16$ of an inch and a spacing of approximately $1/8$ inch.

Wire guards 36 of U shape extend forwardly from the fixed cutter bar 31 substantially perpendicular to the cutter bar and are disposed one between each two adjacent slots 35 in the cutter bar. Each of these guards has its open end adjacent the cutter bar and has one end secured to the continuous lower portion of the bar and its other or upper end secured to the portion of the bar between the corresponding adjacent slots near the upper ends of the slots, as illustrated in Figure 3. These guards divide the grass as the lawn mower moves across the grass and guide the grass into the vertically disposed slots 35 in the fixed cutter bar, this cutter bar being so disposed that its convex outer side faces forwardly and its concave inner side faces rearwardly of the mower.

An inner, reciprocable cutter bar 37 of substantially semi-cylindrical shape, is disposed in the fixed cutter bar 31 with its convex surface closely fitting the concave inner surface of the fixed bar. The inner bar is provided with circumferentially extending slots 38 having a length materially less than the angular extent of the cross sectional area of the inner cutter bar and uniformly spaced apart longitudinally of the bar. In the operative installation mentioned above, a width of the slots or openings of approximately $3/16$ of an inch and a spacing between adjacent slots or openings of approximately ⅛ of an inch has been found to provide satisfactory results.

Adjustable spring seats, as indicated at 39, are mounted in the front cross member 14 of the frame at locations spaced apart along this cross member and corresponding spring seats, as indicated at 40, are mounted on the concave inner side of the reciprocable cutter bar 37. Coiled compression springs 41 are disposed between complementary spring seats 39 and 40 and resiliently press the inner cutter bar 37 against the outer or fixed cutter bar 31 so that an effective shearing action will be provided between the edges of the slots in these cutter bars when the inner bar is reciprocated relative to the outer or fixed bar. The inner bar 37 has a length somewhat less than the distance between the inner sides of the forward extensions of the frame side members 11 and 12 so that this bar is free to reciprocate between these frame members relative to the outer bar. An upstanding rib or flange 42 extends along the lower edge of the outer cutter bar 31 and the bottom edge of the inner cutter bar 37 bears against the inner side of this rib 42 so that the rib holds the inner cutter bar against rotational movement relative to the outer cutter bar.

An internal combustion engine, generally indicated at 44, is mounted on the bottom platform 30 of the frame between the front cross member 14 of the frame and the axle 24 and this engine is of the free piston type, having an elongated, double ended cylinder 45 extending longitudinally of the frame and medially of the width thereof and a double piston structure reciprocably mounted in the cylinder 45 and including spaced pistons 46 and 47 connected together by a rod 48. A partition structure 49 is disposed in cylinder 45 medially of the length of the cylinder and is provided with intake ports 50 and 51 at the respectively opposite side of the partition structure and controlled by flap valves 52 and 53 respectively. The partition is provided with an intake passage 54 and a carburetor 55 is connected to the partition structure 49 and to a fuel tank 56 mounted on the platform 30 and has an air intake 51, so that the carburetor supplies a combustible mixture of air and fuel to the combustion chambers in the respectively opposite ends of the cylinder 45. The cylinder is also provided with exhaust ports 58 and 59 located between the intake ports 52 and 53 respectively and the adjacent head ends of the cylinder and these exhaust ports are interconnected by an exhaust manifold 60 from which extends an exhaust pipe 60'. A piston rod 61 is secured at one end to the piston 46 and extends from this piston through a packing gland 62 in the cylinder head 63 and a similar piston rod 64 is secured at one end to the other piston 47 and extends slidably through a packing gland 65 in the cylinder head 66.

Once the piston structure including pistons 46 and 47 and connecting rod 48 has been started to reciprocate in the cylinder 45 the alternate explosion of combustible mixture in the firing chambers within the cylinder heads 59 and 62 will continue the reciprocation of the piston structure in the cylinder, these explosions being propagated by ignition means including spark plugs 67 and 68 mounted in the cylinder heads 63 and 66 respectively, an ignition coil 69 connected to the spark plugs 69' a battery connected to the coil 69 and current interrupting switches 167 and 168 mounted adjacent the piston rod 61 and alternately closed by a detent 169 on the piston rod, these switches being connected between the battery 69' and the ignition coil 69 and between the ignition coil and the spark plugs 67 and 68 in a manner to provide an ignition spark near the end of each compression stroke of the piston assembly in the cylinder 45.

Figure 9:
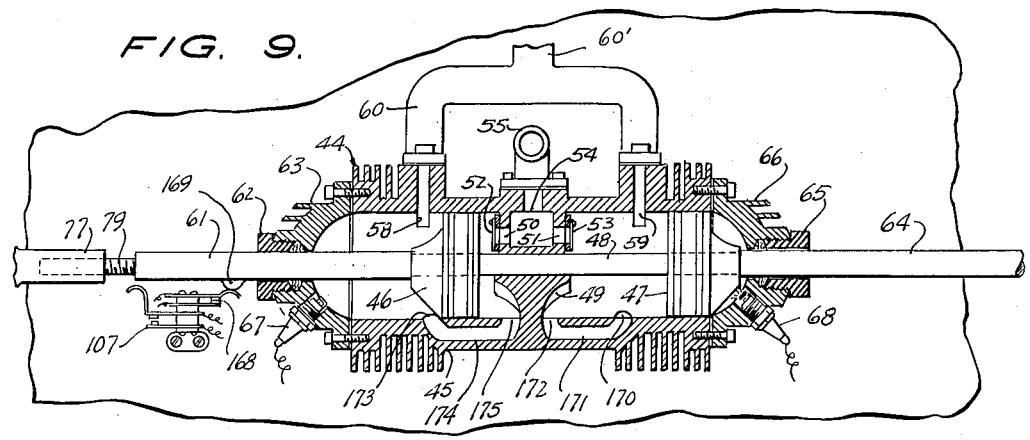
Figure 9 is a fragmentary cross sectional view on an enlarged scale on the line 9—9 of Figure 2.
Figure 10:
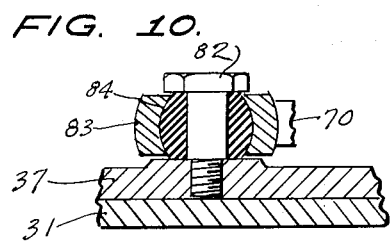
Figure 10 is a fragmentary cross sectional view on an enlarged scale on the line 10—10 of Figure 3.

In the operation of the engine, assuming that the pistons are moving to the left in the engine cylinder, as viewed in Figure 9, a combustible charge will be drawn through the intake port 50 past the valve 52 into the space between piston 46 and partition structure 49 and a charge will be compressed between piston 46 and cylinder head 63. At the same time the combustion expansion of a combustible charge between the cylinder head and the piston 47 will force piston 47 toward the partition structure 49 compressing a new charge between this piston and the partition structure. As soon as the piston moves past the exhaust port 59 and the port 170 at the outer end of fluid passage 171 the inner end of which communicates with the interior of the cylinder adjacent the partition structure 49 through the port 172, the charge compressed between piston 47 and the partition structure 49 will enter the space in the cylinder between the piston 47 and piston head 66 through the port 171 scavenging the exhaust gas from this space through the exhaust port 59 and placing a new combustible charge in the space to be compressed and fired upon subsequent movement of the pistons to the right. After the piston 46 moves to the left sufficiently to close the exhaust port 58 and the inlet port 173 at the outer end of the passage 174 leading from the interior of the cylinder through the port 175 adjacent the partition structure 49, the combustible charge is compressed between the piston 46 and the cylinder head 63 and is fired by the spark plug 67 as the piston 46 approaches its position nearest the cylinder head 63 to drive the piston assembly to the right.

A two cycle operation is thus provided in which each piston successively intakes a combustible charge, compresses the charge at the rear side of the piston, scavenges and recharges the associated combustion chamber, compresses the charge in the combustion chamber and then delivers a power stroke when the charge in the combustion chamber is fired after compression.

A bell crank lever 70 is pivotally mounted at its angle on one end of a bracket 71 secured to the frame side member 11 and projecting inwardly from this side member adjacent the front cross member 14 of the frame. One end of the bell crank member 70 is pivotally connected to the outer end of the piston rod 57 by a pivotal connection 72 and the other end of the bell crank lever is connected to the inner cutter bar 37 by a pivotal connection 73.

Figure 11:
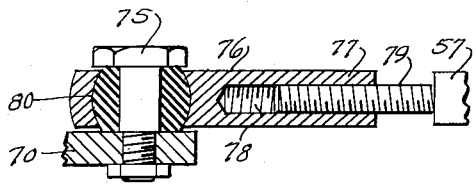
Figure 11 is a fragmentary cross sectional view on an enlarged scale on the line 11—11 of Figure 1.
Figure 12:
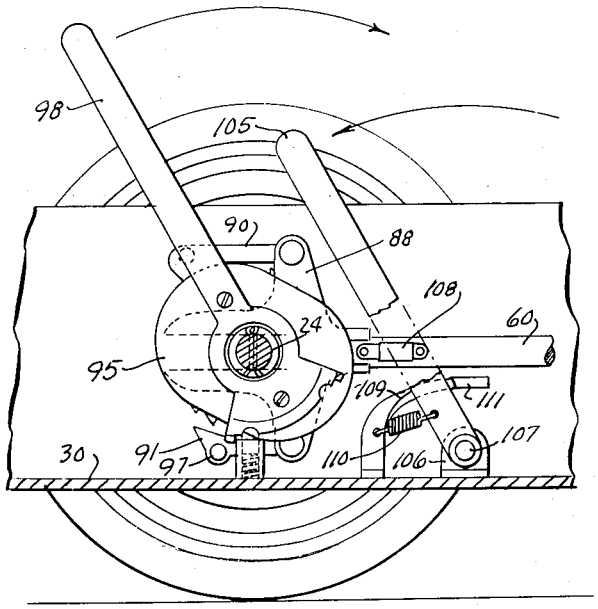
Figure 12 is a fragmentary cross sectional view on an enlarged scale on the line 12—12 of Figure 1.

The pivotal connection 74 between the bell crank lever 70 and the bracket 71 comprises a pivot pin 74' mounted on and projecting upwardly from the bracket and a bearing formation 70' in the bell crank lever surrounding this pin. The pivotal connection 72, as illustrated in Figure 11, however, comprises a pivot pin or bolt 75 secured to and projecting upwardly from the bell crank lever 70, a bearing eye structure 76 having an aperture therein circumspacially surrounding the pin 75 and having a radially projecting extension 77 provided with a screw threaded bore 78 receiving a screw threaded stud 79 projecting from the adjacent end of the piston rod 57, and a bushing 80 of resilient material surrounding the bolt 75 and disposed in the bolt receiving aperture in the eye structure 76. The resilient bushing 80 provides a slight amount of lost motion between the eye structure 76 and the adjacent end of the bell crank lever 70 so that the bell crank lever can swing about its pivotal mounting 74 without bending the connecting rod 57 and the adjustable connection between the structure 76 and the connecting rod 57 provides for the longitudinal adjustment of the piston rod to maintain the proper stroke of the piston structure 46 in the cylinder 45.

The pivotal connection 73 between the bell crank lever 70 and the inner cutter bar 37 comprises a pivot bolt 82, a bearing formation 83 on the corresponding end of the bell crank lever 70 circumspacially surrounding the pin or bolt 82 and a bushing 84 of elastic and resilient material, such as rubber, surrounding the bolt 82 within the bearing formation 83. The bushing 84 provides the necessary amount of lost motion to compensate for the swinging movement of the end of the bell crank lever carrying the bearing formtaion 73 and the straight line reciprocatory movement of the inner cutter bar 37.

A ratchet wheel 85 is mounted on the axle 24 adjacent the mid-length location of the axle and bearing pillars 86 and 87 project upwardly from the platform 30 of the frame at locations spaced from the respectively opposite sides of the ratchet wheel 85 and rotatably receive the axle 24. A crosshead 88 is disposed adjacent one side of the ratchet wheel 85 and has a slot 89 therein receiving the axle 24. The outer end of the piston rod 60 is connected to the cross head 88 so that this cross head is reciprocated relative to the axle 24 when the piston structure 46 reciprocates in the cylinder 45 of the engine 44.

Pawls 90 and 91 are pivotally mounted on the cross head 88 above and below the ratchet wheel 85 respectively and are resiliently held in engagement with the ratchet wheel by torsion springs 92 and 93 respectively connected between these pawls and the cross head. The pawl 90 is shaped to engage and rotate the ratchet wheel 85 when the cross head 88 is moved toward the cylinder 45 and the pawl 91 is shaped to engage and rotate the ratchet wheel when the cross head is moved in a direction away from the engine cylinder. With this arrangement, when the cross head is reciprocated by the associated engine the ratchet wheel will be rotated by the pawls 90 and 91 and will impart rotation to the axle 24 to impel the lawn mower.

A clutch cam 95 is rotatably mounted on the axle 24 adjacent the side of the cross head 88 remote from the ratchet wheel 85 and pins 96 and 97 project laterally from the pawls 90 and 91 respectively and overlie the peripheral surface of the clutch cam 95. A hand lever 98 is secured at one end to the cam 95 therefore rotating the cam on the axle 24 and this cam is operative, when in one rotational position, to move the pawls 90 and 91 out of engagement with the ratchet wheel 85 so that the engine can operate without turning the ratchet wheel and, when in another rotational position, to release the pawls for engagement with the ratchet wheel so that operation of the engine will turn the ratchet wheel and impel the mower.

The ratchet wheel 85 is resiliently connected to the axle 24 by being rotatably mounted on the axle and connected to a hub 100 drivingly secured to the axle by springs 101 and 102 connected between angularly spaced apart locations on the ratchet wheel and arms 103 and 104 projecting radially outwardly from the hub 100.

An engine starting hand lever 105 is pivotally mounted at one end on the platform 30 by means of a bracket 106 secured to the platform and a spring biased pivotal connection 107 between the bracket and the lever which permits lateral swinging movement of the lever, as indicated in full and broken lines in Figure 7. A dog 108 is mounted on the piston rod 60 and near the cross head 88 and is engaged by the lever for moving the piston assembly 46 toward the end of the cylinder assembly including the cylinder head 62 by manually swinging the lever about its pivotal mounting 107 on the platform of the device. A cam 109 mounted on the platform 30 extends into the path of the lever 105 and engages the lever to force the lever out of engagement with the dog 108 as the piston assembly reaches its limiting position adjacent the cylinder head 62 so that, when the engine starts the hand lever will not be jerked in the opposite direction with the possible injury to the person starting the engine.

A tension spring 110 connected between the cam 109 and the lever 105 resiliently retains the lever 105 in its inoperative position and the lever may further be secured in its inoperative position by a hook formation 111 on the distal end of the cam. Once the engine has been started it will simultaneously reciprocate the inner cutter bar 37 and turn the axle 24 in a direction to impel the lawn mower over the ground.

Substantially all of the parts of the lawn mower assembly, above described, can be formed in an inexpensive manner as sheet metal stampings, with the exception of the engine, which, having only a single movable part, can be manufactured at a minimum expense.

A cover 112 fits over the entire frame of the lawn mower rearwardly of the cutter bars 31 and 37 and encloses the engine and the drive mechanism for the lawn mower so that grass cuttings will not accumulate on the engine or the moving parts of the machine to interfere with the operation thereof and a throttle control 113 extends from the engine carburetor along the handle 19 to a location adjacent the handle cross bar 23 where it is provided with a pivotally mounted operating lever 114.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A lawn mower comprising a frame, a fixed cutter bar extending transversely of said frame and mounted thereon, a reciprocable cutter bar slidably mounted on said fixed cutter bar, said cutter bars each comprising a transversely curved body having a convex forward face and a concave rearward face and having a series of transversely extending slots spaced apart longitudinally thereof, and said reciprocable cutter bar being disposed within the concave side of said fixed cutter bar.

2. A lawn mower comprising a frame, a fixed cutter bar extending transversely of said frame and mounted thereon, a reciprocable cutter bar slidably mounted on said fixed cutter bar, said cutter bars each comprising a transversely curved body having a convex forward face and a concave rearward face and having a series of transversely extending slots spaced apart longitudinally thereof, and said reciprocable cutter bar being disposed within the concave side of said fixed cutter bar, and spring means disposed between said frame and said reciprocable cutter bar holding said reciprocable cutter bar in close sliding engagement with said fixed cutter bar.

3. A lawn mower comprising a frame, a fixed cutter bar extending transversely of said frame and mounted thereon, a reciprocable cutter bar slidably mounted on said fixed cutter bar, said cutter bars each comprising a transversely curved body having a convex forward face and a concave rearward face and having a series of transversely extending slots spaced apart longitudinally thereof, and said reciprocable cutter bar being disposed within the concave side of said fixed cutter bar, a bracket secured to said frame, and a bell crank lever pivotally mounted at its angle on said bracket and pivotally connected at one end to said reciprocable cutter bar.

References Cited in the file of this patent

UNITED STATES PATENTS

| | | |
|---|---|---|
| 1,610,498 | Duckett | Dec. 14, 1926 |
| 2,212,665 | Landolt | Aug. 27, 1940 |
| 2,269,858 | Obszarny | Jan. 13, 1942 |
| 2,280,124 | Kinkead | Apr. 21, 1942 |
| 2,339,677 | Burns | Jan. 18, 1944 |
| 2,523,166 | Tom | Sept. 19, 1950 |
| 2,569,269 | Wilkins | Sept. 25, 1951 |

FOREIGN PATENTS

| | | |
|---|---|---|
| 614,353 | Great Britain | Dec. 14, 1948 |